Sept. 22, 1959     L. A. MOREHEAD     2,904,886

SHARP ANGLE OR REENTRANT CORNER TEMPLET DEVICE

Filed Feb. 27, 1953

*INVENTOR.*
LAUREL A. MOREHEAD

BY

ATTORNEY

United States Patent Office 2,904,886
Patented Sept. 22, 1959

2,904,886

SHARP ANGLE OR REENTRANT CORNER TEMPLET DEVICE

Laurel A. Morehead, St. Paul, Minn., assignor to Chemetron Corporation, a corporation of Delaware Application February 27, 1953, Serial No. 339,387

8 Claims. (Cl. 33—23)

This invention relates in general to templets for guiding flame cutting torches in shape cutting operations and more particularly to a templet device for guiding the cutting of a sharp angle or reentrant corner or turn with flame cutting apparatus.

Heretofore in the machine flame shape cutting art, difficulty has been experienced in obtaining sharp reentrant corner or angle cuts without resorting to extremely complicated and expensive templet tracer means wherein the direction change response time of the templet tracer is infinitesimally short. Such devices usually entail light beam responsive and electronic means.

A mechanical means for fairly rapid direction change response to conventional rail or strip templets has been found in swivel differential drive templet tracer devices wherein the driving wheels straddle the templet, but here again the sharpness of any corner or angle cut is limited by the radius of the pivoting wheel of the templet tracing device, and the corresponding radius of curvature required in the templet rail or strip itself. Such differential drive templet tracers are, however, relatively costly and somewhat more bulky than the standard non-differentially driven templet tracer devices more prevalent in the field of machine flame shape cutting today. In the latter devices, only one of the templet straddling wheels is uniformly driven, the other wheel being merely an idler wheel.

Accordingly, it is applicant's principal object to achieve sharp angle or reentrant cuts from conventional rail or strip type templets with more or less conventional non-differentially driven swivel templet tracer devices.

Another object of the invention resides in the provision of a pivotal piece or gate for insertion into a templet pattern at the position where a sharp reentrant bend or angle cut is desired. Numerous additional advantages and features will become readily apparent as the following description proceeds taken in conjunction with the accompanying drawings in which.

Figure 1:
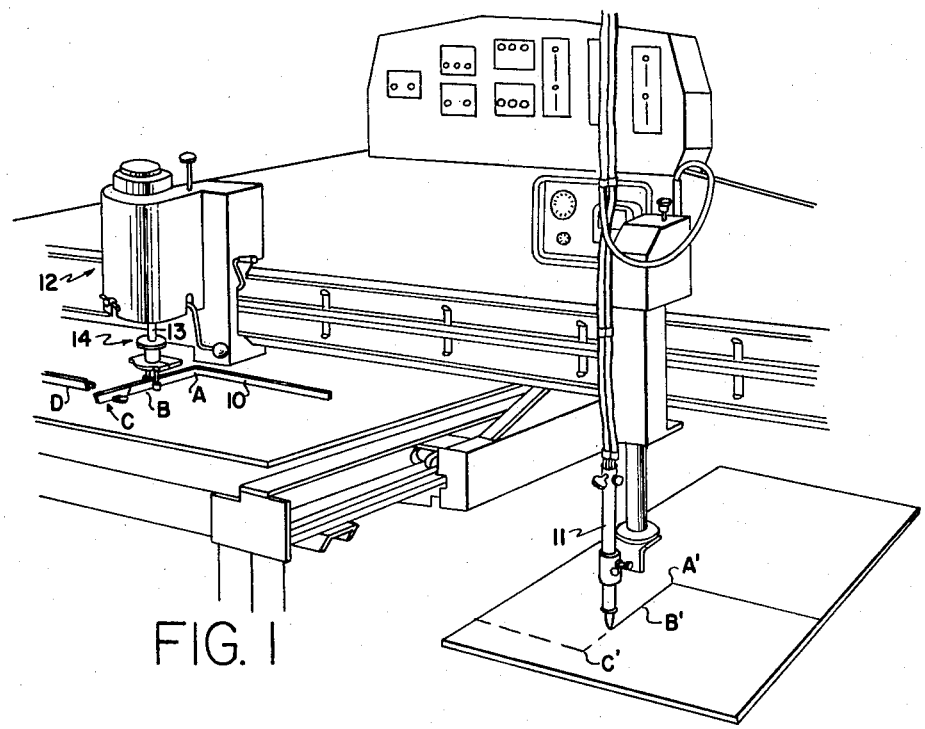
Fig. 1 is a perspective view showing a standard machine flame shape cutting machine of the Chouinard type embodying the novel templet device of the instant invention.

The general apparatus guided in a shape cutting operation by a templet 10 as shown in Fig. 1 will not be described in detail herein as it is now well known in the art and comprises in substance a flame shape cutting machine of the type shown and described in Alfred F. Chouinard Patent No. 2,336,596 and to which reference may be had. However in passing, it might be noted that although for convenience of illustration, in Fig. 1 only one cutting torch 11 has been shown, in templet guided flame shape cutting, it is usual that three or four such torches are simultaneously guided to cut a corresponding plurality of shapes from a single templet on the table portion of the machine as seen in the left hand portion of Fig. 1 and associated templet tracer 14 driven by a drive unit 12 of the cutting machine.

Figures 3, 4:
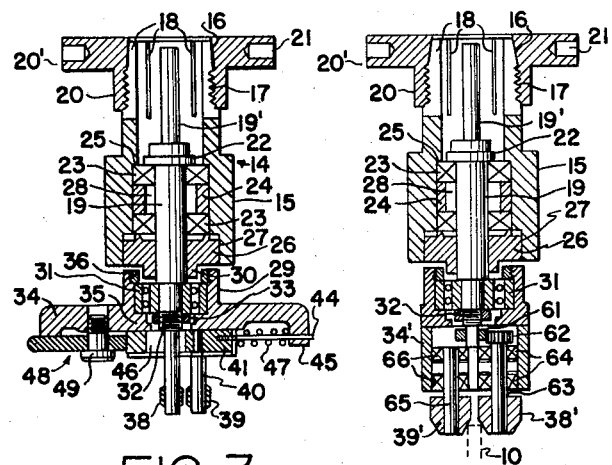
Fig. 3 is a central longitudinal section of a standard swivel templet tracer device, non-differentially driven.
Fig. 4 is a central longitudinal section of a modified swivel dual offset templet tracer device, also non-differentially driven.

A typical non-differentially driven swivel templet tracer for connection to the drive unit 12 is found in Fig. 1 indicated generally at 14 and is shown in greater detail in Fig. 3. The tracer device 14 as illustrated in Fig. 3 comprises a sleeve 15 which at its upper end is tapered at 16, threaded at 17 and slotted at 18 so that in cooperation with a correspondingly internally tapered and threaded locking nut 20, a simple chuck arrangement is provided for securing the sleeve 15 to a spindle sleeve 13 from which the driving spindle of the drive unit 12 rotatably extends and which in turn is connected to the longitudinally and transversely movable cutting machine carriage as disclosed in the above referred to patent.

The driving spindle (not shown) may be internally and longitudinally broached adjacent its depending end, that is the end rotatably extending from within sleeve 13, to snugly fit over the upper end 19' of the swivel tracer central shaft 19 which upper end is formed with two oppositely arranged flat sides so that a non-slip connection is obtained between the driving motor spindle (not shown) and the central shaft 19 of the tracer 14 and held in such position by the chuck arrangement 16–18 secured to sleeve 13. To facilitate hand tightening, lip 20' of the chuck nut 20 may be externally knurled and additionally, a plurality of short bores 21 may be provided for the insertion thereinto of pins or a spanner wrench in the event that greater tightening leverage is desired.

The central tracer shaft 19 is rotatably journalled within the sleeve 15 by means of an integral shoulder 22 bearing on one of a pair of bearings 23, preferably of the ball type, spaced apart by a bushing 24. The upper bearing of this pair abuts a shoulder 25 in sleeve 15 and a closure piece 26 is positioned as by a press fit into an end counterbore 27 in sleeve 15 so as to bear against the other or lower bearing 23 of said pair. The space 28 between the pair of bearings 23, bushing 24 and the central shaft 19 may be utilized to hold an internal lubricant supply.

The central tracer shaft 19 extends slightly below an outer collar like end 30 of closure 26 where it is reduced in diameter to accept a race enclosed bearing 31, again preferably of the ball type. Immediately below the bearing receiving reduced portion, the shaft 19 is again slightly reduced in diameter and a small portion 32 is threaded, preferably left hand, to receive a nut 33 correspondingly threaded to bear against the race of bearing 31 and hold it fixed to shaft 19.

An integral collar 29 of a swivel plate 34 surrounds the bearing 31. The swivel plate 34 has an enlarged central bore communicating with collar portion 29, the dimension of the bore providing an annular supporting shoulder below bearing 31. The swivel plate is secured to the race of bearing 31 by a gland-like threaded lock ring 36 received in internal threads in collar 29 above the bearing 31. The swivel plate 34 is accordingly rotatable relative to the sleeve portion 15.

At the end of central shaft 19 which extends through and below swivel plate 34, there is keyed or splined thereto a knurled or otherwise externally abraded or grooved driving wheel 38 adapted to tractively engage a side of the upstanding templet strips or rails 10.

Offset from the driving wheel 38 and adjacent thereto is an idler wheel 39 which may or may not be tractive. The idler wheel 39 is rotatably mounted and maintained on the end of a stub shaft 40 offset from but parallel to shaft 19. The other or upper end of the stub shaft 40 is fixed or keyed into a tension plate 41 which is slidably secured against the underside of the swivel plate 34 by means of pins 44 threaded laterally in and slidably extending through a depending ear 45 of the swivel plate 34. The tension plate 41 is provided with a central slot 46 to accommodate the lower extension of central driving shaft 19 and is laterally acted upon by compression springs 47 surrounding pins 44 and positioned between tension plate 41 and the ear 45 of the swivel plate 34. In this manner the idler wheel 39 is at all times urged toward the driving wheel 38 under the tension of the compression springs 47 so that when the templet strip 10 is between wheels 38 and 39, sufficient tension is maintained to provide the driving wheel 38 with adequate traction to enable it to drive the tracer 14 and connected apparatus without slippage.

A cam and lever arrangement 48 pivotally secured to swivel plate 34 by pivot pin 49 is provided for urging tension plate 41 against the tension of springs 47 so that wheels 38 and 39 may be separated when the device is initially lowered into engagement with the templet 10, or when it is to be released.

Templets for guiding cutting torches through the medium of a swivel templet tracer such as has just been described are generally constructed by affixing to any suitable base or plate metallic strips or rails conforming to the shape desired to be cut by the torches. A typical templet of this kind will utilize thin gauge steel or other metallic strips in the neighborhood of ¾ to 1 inch in height and ⅟₁₆ to ⅛ inch in thickness, and are usually either tackwelded to a thin gauge sheet steel plate base or otherwise affixed with brackets to a wooden or similar base.

Where sharp corners, bends or angles are desired to be cut, corresponding sharp bends cannot be made in the templet as that would result in stalling of the tracer because it cannot travel around any bend, angle or corner in the templet of smaller radius than the radius of the pivoting templet tracer wheel.

Figure 2:
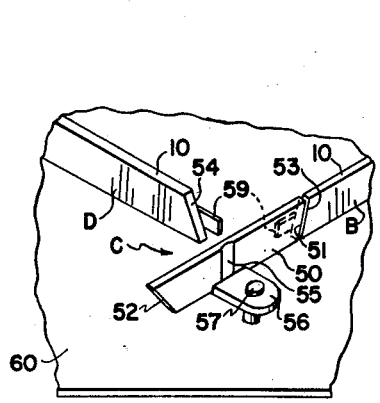
Fig. 2 is a perspective view of a portion of a templet embodying the sharp angle or corner turning templet device of this invention in detail.

Assuming for purposes of illustration and referring to Fig. 1, that the templet guided cut has begun at the right hand edge of the plate workpiece directly beneath the torch 11 and that over on the cutting machine table in the left hand portion of the figure, the driving wheel 38 of the templet tracer described above is on the near side of the templet 10, and that the torch path corresponds to the axis of the driving wheel 38. In this manner, as the tracer 14 drives along the templet 10 from right to left it arrives at the corner or turn marked A, whereupon wheel 38 pivots and momentarily thereafter moves on along path B, the idler wheel 39 following on the outside of the turn. Due to the fact that the bend A in the templet corresponds to the radius of the driving wheel 38, the driving wheel axis moves off adjacently parallel to path B at a right angle to its former path and torch 11 cuts a correspondingly sharp, right angle cut in the workpiece. In this manner, a square, rhombus or other closed templet shape can be cut and so long as the templet tracer is guided in turns toward the direction of the axis of its drive wheel 38, sharp angle cuts can simply be achieved. However, where an opposite direction turn is desired, that is, in the direction of the axis of idler wheel 39, as indicated at C, if the same simple strip templet is continued and shaped to conversely correspond to bend A and the radius of idler wheel 39, it will now be the idler tracer wheel 39 which pivots in the templet corner or turn corresponding to its radius, and driving wheel 38 continues to drive around the outside or greater curvature of this radiused corner. The torch 11, following a path corresponding to the axis of driving wheel 38 will likewise traverse a curved path which will have even a greater radius because of the spaced position of the driving wheel axis, and corner C would then have considerable curvature rather than the desired right angle achieved at A'. This is referred to as a reentrant corner or angle and it is to permit achievement of such sharp reentrant angled corners or turns at C' that the device shown in detail in Fig. 2 has been conceived.

The reentrant corner or angle turning gate indicated generally at C comprises a short movable section 50 of the templet strip or rail 10, preferably but not necessarily bevelled at its ends 51, 52 to mate with the ends 53, 54 of the templet 10 sections which it adjoins and which terminate just short of the point where if projected, they would intersect. Substantially at the point of projected intersection, the side of gate 50 which is to accommodate driving wheel 38 is provided, as shown, with a vertical notch or groove 55 the radius of curvature of which preferably corresponds to the radius of drive wheel 38. It is apparent that regardless of the actual operating position of the entire device, the notch or groove 55 in the templet section 50 must be transverse to the direction of travel of the tracer 14. At the lower end of the notch 55 and laterally extending from gate 50 is a small pivot tab 56, the bottom of which lies in the same plane as the base or bottom edge of the gate 50 and the adjacent templet strips 10. In line with the notch 55, said line being perpendicular to the notched side of gate 50, and precisely the distance of the radius of driving wheel 38 therefrom is positioned a pivot pin or screw 57 secured to the templet base 60 and about which the tab 56 and gate 50 are rotatable. It will therefore be seen that the axis of pivot pin 57 will coincide with the axis of the driving wheel 38 when said wheel is momentarily engaged in the notch 55, and in any event corresponds to the point of direction change of the axis of the cutting torch being guided. Gate stops 59 are provided to limit movement of the gate 50 to its respective in-line positions with relation to the adjacent templet sections 10 on either side of the corner or angled turn to be made.

In operation, as the templet tracer 14 moves along templet section B, driving wheel 38 is turning clockwise and the device smoothly leaves the fixed templet portion 10 and enters upon the gate 50. It is to be noted that the gate stops 59 are sufficiently below the top of the templet strip 10 so as not to interfere with the progress of idler wheel 39. When driving wheel 38 enters notch or groove 55, its tractive movement relative to the templet gate 50 is momentarily arrested and its turning moment is simultaneously applied about pivot pin 53, the axis of which is coincident with that of driving wheel 38. The gate 50 thereby turns until its rotation is arrested by the other limit stop 59 whereupon the driving moment of wheel 38 is again applied about its own axis and tractive movement relative to the gate 50 resumes, readily moving out of the shallow notch 55 so that the tracer moves off gate 50 and onto leg D of the templet 10. It is obvious that similar devices C may be inserted at any number of opposite or reentrant corners or angles in a templet of any shape and likewise, that the gate device can be arranged to guide sharp angle cuts of up to nearly 180 degrees.

Another non-differentially driven templet tracer device which is operable with the reentrant sharp angle turning device C of this invention in substantially the same form is illustrated in Fig. 4. This templet tracer is of precisely the same construction as the tracer in Fig. 3 except that the lower swivel portion and the driving wheel arrangement is modified somewhat. In this modification, immediately below threaded portion 32, the shaft 19 terminates in a gear 61 in mesh with a single offset gear 62 preferably having the same number of teeth. The gear 62 is at one end of a stub shaft 63 which is journalled in suitable bearings 64 and terminates below a modified swivel housing 34' in a tapered traction adapted drive wheel 38'. Opposite the stub shaft 63 and also equally offset from the axis of shaft 19 is an idler stub shaft 65 suitably journalled in bearings 66 and terminating in an idler wheel 39' knurled and tapered like drive wheel 38', in alignment therewith and closely adjacent thereto. Unlike the tracer of Fig. 3, no tension device is provided nor is it necessary as this follower merely straddles the top edges of the strip or rail templet as indicated in phantom lines at the bottom of Fig. 4, and in general the torch axis corresponds to the templet center line. The tracer of Fig. 4 will operate in substantially the same manner with the reentrant angle turning device C as the follower of Fig. 3. However, it is recommended that with this tapered wheel dual offset wheel type tracer, the notch 55 be merely made in the outside top edge of the gate 50 at an angle somewhat more closely corresponding to the angle of the drive wheel taper rather than vertically and the pivot 57 should substantially coincide with the projected intersection of the adjacent templet sections.

The instant invention resides in the novel arrangement and proportioning of the various parts and all such modifications and adaptations as will suggest themselves to those skilled in the art and within the spirit of this invention are intended to be included as within the scope of this invention, best defined in the appended claims.

I claim:

1. A templet device for guiding machine flame shape cutting apparatus by means of a templet tracer provided with a motor driven wheel adapted for tractive engagement with the templet device, said templet device being pivotally mounted for rotation about a preselected axis always in a plane common with the axis of said driven wheel, and arresting means associated with said templet device for positively arresting tractive movement of the templet tracer relative to the pivotally mounted templet device and for transferring the motor-developed torque of said motor driven tracer from the motor driven templet tracer wheel to the pivot of said templet device to rotate the templet device to a different position when the said axes are substantially coincident.

2. A templet device for guiding machine flame shape cutting apparatus by means of a uniformly motor driven templet tracer wherein the driving force is transmitted to a wheel tractively engaged with said templet device, said templet device being pivotally mounted about an axis, a notch in said templet device for positively arresting the tractive movement of the templet tracer relative to the pivotally mounted templet device and for transferring the motor-developed torque of said motor driven tracer to the pivot of said templet device to rotate the templet device to a different position, said pivot being positioned on a line through the center of said notch perpendicular to said templet device at a distance therefrom equal to the radius of said wheel.

3. A templet device for guiding machine flame shape cutting apparatus by means of a uniformly motor driven templet tracer wherein the driving force is transmitted to a wheel tractively engaged with said templet device, said templet device being pivotally mounted about an axis, a notch in said templet device for positively arresting the tractive movement of said wheel relative to the templet device and for transferring the motor developed torque of said motor driven wheel to the pivot of said templet device to rotate the templet device to a different rotational position, said pivot being positioned on a line through the center of said notch perpendicular to said templet device at a distance therefrom equal to the radius of said wheel, and stop means for halting the rotational movement of said templet device at a preselected different rotational position and for retransferring the motor developed torque of the tracer wheel to the templet device permitting resumption of tractive movement between said wheel and templet device.

4. A templet device for guiding machine flame shape cutting apparatus by means of a uniformly motor driven templet tracer wherein the driving force is transmitted to a wheel tractively engaged with said templet device, said templet device being pivotally mounted about an axis, a notch in said templet device for positively arresting the tractive movement of said wheel relative to the templet device and for transferring the motor developed torque of said motor driven wheel to the pivot of said templet device to rotate templet device, said pivot being positioned so that its axis is coincident with the axis of said driving wheel when the wheel is in engagement with said notch, and stop means for halting the rotation of said templet device in a preselected angular position and for retransferring the motor developed torque of the tracer wheel to the templet device permitting resumption of tractive movement between said wheel and templet device.

5. Templet apparatus for guiding machine flame shape cutting apparatus in sharply defined angularly disposed paths by means of a constant speed motor driven templet tracer wherein the force is transmitted to a wheel tractively engaged with said templet, including two fixed sections of templet angularly disposed and a movable templet section in alignment with one of said fixed templet sections and mounted for rotation about a pivot axis adjacent the projected point of intersection of said fixed templet sections, a notch in said movable templet section adjacent said pivot axis for positively arresting the tractive movement of said driving wheel relative to the templet and for transferring the motor developed torque of said motor driven tracer to the pivot axis of said movable templet section to rotate the templet section, and stop means for halting the rotation of said movable templet section in alignment with the other fixed templet section.

6. Templet apparatus for guiding machine flame shape cutting apparatus in sharply defined paths forming reentrant angles by means of a constant speed motor driven templet tracer wherein the motor force is transmitted to a driving wheel tractively engaged with one side of said templet, comprising a fixed section of templet having at least one bend, toward the side of the templet on which the driving wheel is tractively engaged, another fixed templet section an adjacent portion of which at least is separated from and angularly disposed to said first fixed section, a movable straight templet section adapted to be aligned with one of said fixed templet sections and mounted for rotation about a pivot axis adjacent the projected point of intersection of said angularly disposed adjacent sections, said movable section having a notch adjacent said pivot axis for positively arresting the tractive movement of said driving wheel relative to the templet and for transferring the motor developed torque of said motor driven tracer to the pivot axis of said movable templet section to rotate the templet section, and stop means for halting rotation of said movable templet section in alignment with the fixed section angularly disposed to said first fixed section.

7. Method of cutting reentrant corners and sharp angle turns with a machine operated flame cutting torch responding to a tracer provided with a motor driven rotating element in frictional engagement with a templet and which templet is rotatable about an axis always in a plane common with the axis of the said rotating element of the tracer, comprising continuously rotating said rotating element throughout the following sequence of steps: moving said tracer relative to said templet by tractive engagement with said templet of said continuously rotating element to a position at which the respective axes of the rotating element and the rotatable templet are substantially coincident, positively halting tractive movement of the rotating tracer element relative to the templet and simultaneously rotating the rotatable templet to a different position under the directly applied torque of the motor driven rotating element, and halting the rotation of the templet while simultaneously resuming the tractive engagement of the continuously rotating element relative to the templet.

8. A templet device for guiding machine flame shape cutting apparatus by means of a templet tracer provided with a motor driven wheel adapted for trative engagement with the templet device, said templet device being pivotally mounted for rotation about a preselected axis always in a plane common with the axis of said driven wheel, arresting means associated with said templet device for positively arresting tractive movement of the templet tracer relative to the pivotally mounted templet device and for transferring the motor-developed torque of said motor driven tracer from the motor driven templet tracer wheel to the pivot of said templet device to rotate the templet device to a different position when the said axes are substantially coincident, and stop means for halting the rotational movement of said templet device at a preselected different rotational position and for retransferring the motor-developed torque of the driven wheel of the tracer device directly to the templet device permitting resumption of tractive movement between said wheel and the templet device.

References Cited in the file of this patent

UNITED STATES PATENTS

| | | |
|---|---|---|
| 520,527 | Hunter | May 29, 1894 |
| 1,881,033 | Smith | Oct. 4, 1932 |
| 2,002,073 | Anderson | May 21, 1935 |
| 2,062,380 | Smith | Dec. 1, 1936 |
| 2,456,789 | Krohn | Dec. 21, 1948 |
| 2,571,196 | Buckman | Oct. 16, 1951 |
| 2,677,182 | Barr | May 4, 1954 |

FOREIGN PATENTS

| | | |
|---|---|---|
| 668,913 | Germany | Dec. 13, 1938 |
| 660,772 | Great Britain | Nov. 14, 1951 |